US008864145B2

(12) United States Patent
Haller

(10) Patent No.: US 8,864,145 B2
(45) Date of Patent: Oct. 21, 2014

(54) DEVICE AND METHOD FOR SUSPENSION OF A VEHICLE SEAT BY MEANS OF ADDITIONAL VOLUMES

(75) Inventor: Erwin Haller, Birgland (DE)

(73) Assignee: Grammer AG, Amber (DE)

( * ) Notice: Subject to any disclaimer, the term of this patent is extended or adjusted under 35 U.S.C. 154(b) by 158 days.

(21) Appl. No.: 12/720,527

(22) Filed: Mar. 9, 2010

(65) Prior Publication Data

US 2010/0213345 A1  Aug. 26, 2010

Related U.S. Application Data

(63) Continuation-in-part of application No. 11/382,686, filed on May 10, 2006, now abandoned.

(51) Int. Cl.
*B60G 17/02* (2006.01)
*B60N 2/52* (2006.01)
*B60N 2/50* (2006.01)

(52) U.S. Cl.
CPC ............... *B60N 2/502* (2013.01); *B60N 2/525* (2013.01); *B60N 2/501* (2013.01); *B60N 2/508* (2013.01); *B60N 2/505* (2013.01)
USPC .................... 280/5.515; 280/124.157; 701/36

(58) Field of Classification Search
USPC ............ 248/157, 419, 424, 562, 565, 566; 296/65.01, 65.11, 65.12, 65.18; 297/311, 312; 701/36; 180/271, 273; 280/5.5–5.524, 124.157, 124.16
See application file for complete search history.

(56) References Cited

U.S. PATENT DOCUMENTS

| | | | |
|---|---|---|---|
| 3,466,055 | A | 9/1969 | Keijzer |
| 3,762,769 | A | 10/1973 | Poschi |
| 3,966,223 | A | 6/1976 | Carr |
| 4,193,629 | A | 3/1980 | Merkle |
| 4,283,087 | A | 8/1981 | Kauss et al. |
| 4,418,955 | A | 12/1983 | Muncke et al. |
| 4,451,079 | A | 5/1984 | Takahashi |
| 4,463,839 | A | 8/1984 | Ashiba |
| 4,600,215 | A | 7/1986 | Kuroki et al. |
| 4,634,142 | A | 1/1987 | Woods et al. |
| 4,645,042 | A | 2/1987 | Inoue et al. |

(Continued)

FOREIGN PATENT DOCUMENTS

| | | |
|---|---|---|
| CN | 1537747 | 10/2004 |
| DE | 19714576 | 10/1998 |

(Continued)

*Primary Examiner* — Alfred J Wujciak
(74) *Attorney, Agent, or Firm* — Lowe Graham Jones PLLC

(57) ABSTRACT

A device and method for suspension of a vehicle seat by means of additional volumes, in particular a utility vehicle seat, comprising at least one air spring for height adjustment of a seat part of said air spring being arranged between the seat part and a lower part, and a control device for controlling the supply and discharge of at least one additional volume to or from the air spring, wherein, at predefinable speed or acceleration values of a spring movement of the air spring, the additional volume which can be supplied or discharged can be switched on or off by means of the control device in such a way that, in end-of-travel regions of the air spring, the profile of a force/travel air spring characteristic during an extension and/or return spring movement of the air spring does not exhibit any incline in a first and in a second range.

4 Claims, 11 Drawing Sheets

(56) References Cited

U.S. PATENT DOCUMENTS

| | | | |
|---|---|---|---|
| 4,700,971 A | 10/1987 | Doi et al. | |
| 4,726,604 A | 2/1988 | Asami et al. | |
| 4,729,580 A | 3/1988 | Buma et al. | |
| RE33,626 E | 7/1991 | Asami et al. | |
| 5,217,210 A | 6/1993 | Schützner | |
| 5,255,935 A | 10/1993 | Imani | |
| 5,324,069 A | 6/1994 | Ogawa | |
| 5,425,436 A | 6/1995 | Teramura et al. | |
| 5,428,533 A | 6/1995 | Ogawa | |
| 5,450,322 A | 9/1995 | Tanaka et al. | |
| 5,513,108 A | 4/1996 | Kishimoto et al. | |
| 5,527,060 A | 6/1996 | Kutsche | |
| 5,555,501 A | 9/1996 | Furihata et al. | |
| 5,558,398 A | 9/1996 | Santos | |
| 5,603,387 A | 2/1997 | Beard et al. | |
| 5,623,410 A | 4/1997 | Furihata et al. | |
| 5,941,920 A | 8/1999 | Schubert | |
| 6,000,703 A | 12/1999 | Schubert et al. | |
| 6,029,764 A | 2/2000 | Schubert | |
| 6,067,491 A | 5/2000 | Takahashi | |
| 6,199,820 B1 * | 3/2001 | Ritchie | 248/550 |
| 6,314,353 B1 | 11/2001 | Ohsaku et al. | |
| 6,467,748 B1 * | 10/2002 | Schick et al. | 248/550 |
| 6,886,650 B2 * | 5/2005 | Bremner | 180/89.13 |
| 7,997,600 B2 | 8/2011 | Haller et al. | |
| 8,342,541 B2 * | 1/2013 | Wurmthaler et al. | 280/5.515 |
| 8,682,528 B2 * | 3/2014 | Contratto et al. | 701/36 |
| 2001/0044685 A1 | 11/2001 | Schubert | |
| 2003/0015830 A1 | 1/2003 | Miller et al. | |
| 2003/0140487 A1 | 7/2003 | Plettner | |
| 2004/0094912 A1 | 5/2004 | Niwa et al. | |
| 2004/0227050 A1 | 11/2004 | Haller | |
| 2005/0278094 A1 * | 12/2005 | Swinbanks et al. | 701/37 |
| 2006/0255623 A1 | 11/2006 | Haller | |
| 2010/0237656 A1 | 9/2010 | Haller | |

FOREIGN PATENT DOCUMENTS

| | | |
|---|---|---|
| DE | 20214583 | 1/2003 |
| EP | 0089794 | 9/1983 |
| EP | 1188608 | 3/2002 |
| EP | 1352595 | 10/2003 |
| EP | 1464866 | 10/2004 |
| EP | 1468870 | 10/2004 |
| JP | 61075008 | 4/1986 |
| JP | 2133215 | 5/1990 |
| JP | 2197470 | 8/1990 |
| JP | 3200485 | 9/1991 |
| JP | 406191444 | 7/1994 |
| WO | 8703256 | 6/1987 |
| WO | 8912766 | 12/1989 |

* cited by examiner

DEVICE AND METHOD FOR SUSPENSION OF A VEHICLE SEAT BY MEANS OF ADDITIONAL VOLUMES

PRIORITY CLAIM

This application is a continuation-in-part of U.S. patent application Ser. No. 11/382,686 filed May 10, 2006 which claims priority to German Application Serial No. 10 2005 023 088.1 filed May 13, 2005; contents of which are incorporated herein.

BACKGROUND OF THE INVENTION

Suspension devices for vehicle seats are known in particular for damping a height excursion of the vehicle seat when travelling over uneven road surfaces, such as potholes, EP 1 188 608 A1 discloses an active damping system for sprung vehicle seats in which, in addition to a mechanical flexible connection device, a pneumatic off-load device and a hydraulic actuator are arranged between a seat part and a lower part which is connected to the vehicle. Both the pneumatic off-load device and the hydraulic actuator are controlled by a control device as a function of a seat error signal, which is generated for example by a jerky height adjustment of the seat part.

Such hydraulic actuators require a connection to the on-board power supply of the vehicle, in particular a utility vehicle, such as a tractor. Such a connection means that the action of the active damping of the vehicle seat is dependent on the function of the on-board power supply and in particular the parameters thereof, so that the parameters of the damping system have to be matched to the parameters of the on-board power supply and thus the system has to be adapted to the respective utility vehicle. Moreover, such suspension devices are of simple design in so far as the hydraulic actuator, upon receipt of a position error signal in relation to the vehicle seat, which is subjected to the weight of a driver, is supplied with air by means of a compressor and as a result an increased air volume is created for sufficient damping of the vehicle seat along their height adjustment, such suspension devices do not have any comfort region which extends over a relatively long section of the height adjustment travel and thus represents uniform suspension within this height adjustment range with the same return forces.

Also known are air springs which have a linear force/travel air spring characteristic, the incline in which differs as a function of the configuration of the air spring and an applied additional volume. In such air springs, use is usually made of additional volumes which are kept constant and which are associated with the extending and retracting air spring as the actual air volume of the air spring.

Such air volumes which are kept constant mean that, when the air spring is set with a force/travel air spring characteristic having a small incline, it is not possible for the seat part to swing back into a central position of the force/travel air spring characteristic since friction forces within the suspension device as a whole are greater than a return force within the force/travel air spring characteristic.

On the other hand, if the suspension device is designed such that the return force is greater—that is to say a greater incline of the air spring characteristic is set—a relatively hard damping is achieved both in the central travel region and in the end-of-travel regions of the air spring.

Moreover, when using an air spring in an air spring characteristic range with a small incline (the so-called comfort range), which requires the switch-on of a large additional volume, it is probable that the end stops in end-of-travel regions of the air spring will be reached in the event of considerable extension and retraction movements due to considerable unevenness, as a result of which a reduced seating comfort is obtained for the user of the vehicle seat. In this case of air springs for vehicle seats, the setting of a comfort range is usually desired on account of better transmission values and the resulting higher level of comfort.

Such a comfort range of the air spring characteristic has to date been set by the manufacturer such that it can be used universally for different roads and ground with different levels of unevenness. Since tractors in particular, which travel both on tarred roads and on dirt tracks or even on fields, have very different requirements in terms of optimizing the suspension device or a suspension system for the tractor vehicle seat, a universal comfort range that has been set from the start can be only a compromise for effective suspension of the vehicle seat on different types of ground.

SUMMARY OF THE INVENTION

Accordingly, the object of the present invention is to provide a suspension device for a vehicle seat which permits increased driving comfort for a user during use of the vehicle seat in a comfort range, which is represented by a force/travel air spring characteristic with very small incline or no incline at all, and in end-of-travel regions which lie outside the comfort range. The object of the invention is also to provide a method for suspension of the vehicle seat by means of such a suspension device.

This object is achieved in respect of the device by the features of Claim 1 and in respect of the method by the features of Claim 9.

The core concept of the invention is to provide a suspension device for a vehicle seat, in particular a utility vehicle seat, comprising at least one air spring for height adjustment of a seat part, said air spring being arranged between the seat part and a lower part, and a control device for controlling the supply and discharge of at least one additional volume to or from the air spring, which, at predefinable speed or acceleration values of a spring movement of the air spring, allows the additional volume which can be supplied or discharged to be switched on or off by means of the control device in such a way that, in end-of-travel regions of the air spring, the profile of a force/travel air spring characteristic during an extension and/or return spring movement of the air spring does not exhibit any incline or exhibits only a small incline in a first and in a second range. In this way, depending on the speed with which the air spring extends due to the uneven ground on which the utility vehicle, such as a tractor for example, is moving, a type of ground detection is carried out which, by means of the control device functioning as software, calls up a predefinable procedure for the supply and discharge of the additional volume which is provided for the respective type of ground. Particularly when the air spring is moved at medium, high and very high speeds, that is to say when the spring travel of the air spring changes at medium, high and very high speeds, and possibly with measured values being added to the amplitude values of the spring travel, the additional volume is switched on in the end-of-travel regions or is maintained in comparison to the comfort range, in such a way that the air spring does not experience any change in force either during extension or during its return or during both movements, as shown in the characteristic curve of the force/travel diagram.

By way of example, at a first, medium speed or acceleration value, the vibration-damping additional volume which can be supplied and discharged in the first and second range during the extension spring movement is in each case smaller than in a third range (the comfort range) which lies between the first and second range, or is fully switched off, so that as a result a rise in pressure is obtained in the end-of-travel regions during the extension of the air spring, which leads to a shortening of the spring travel. During the return spring movement, the additional volume is then partially or fully switched on, so that as a result a horizontally running section is obtained within the force/travel air spring characteristic. This leads to a return of the air spring with an additional volume having a value from a range of for example 0.1 10 l, and to reduced vibration.

From a second speed or acceleration value, which corresponds to a considerable introduction of force and thus lies above the first value, the additional volume within the first and second range is switched on both during the extension spring movement and during the return spring movement, resulting in a type of neutral position of the suspension system as a whole. There is therefore no rise in pressure in the first and second ranges, which represent the end-of-travel regions and lie outside the comfort range, regardless of whether the air spring is subjected to pressure or tensile stress, that is to say whether the vehicle seat is moved downwards or upwards. The air spring thus extends and returns in this first and second range without any opposing force. Vibration is reduced.

At a third speed or acceleration value, which corresponds to a very considerable introduction of force and lies above the two previous values, the additional volume in the first and second range for the extension movement is in each case greater than in the third range, or is fully switched on, and during the return spring movement is fully switched off or is supplied to a lesser extent than in the third range. There is therefore no rise in pressure in the first and second ranges during the extension movement of the spring, for which reason the air spring extends and returns without any opposing force. At the point of reversal of the movement direction, that is to say during the return spring movement, an increase in energy or a progression takes place as the vehicle seat moves upwards and a reduction in energy or a depression takes place as the vehicle seat moves downwards. In both cases, vibration is very considerably reduced as a result a high level of damping thus takes place.

According to one preferred embodiment, the third range within the force/travel air spring characteristic, as the comfort range of the suspension device, is designed to have a variable width depending on further speed or acceleration values, which lie below the first, second and third speed or acceleration values, and optionally depending on predefinable amplitude values of the spring movement. As a result, on account of the measured speed or acceleration values and optionally the detected excursion distances or amplitude values, which make it possible to determine the type of ground on which the vehicle, for example a tractor, is currently travelling, a mode assigned to these values is called up within the control device, said mode defining the boundaries of the comfort range. By way of example, when travelling on a tarred road, low speed values and excursion distances and measured, whereupon the "road" mode is activated, said mode not providing for any comfort range since a sufficiently precise central seat position is ensured without any large excursion distances. Other modes are "road transition", at which a transition from the tarred road to a dirt track or vice versa takes place and thus a narrower comfort range is defined, and the "difficult ground/field, etc." mode, in which a wide comfort range is set on account of the introduction of considerable forces, which mean relatively large excursion distances and relatively high speed values.

According to one preferred embodiment, the suspension device has at least one pneumatic directional control valve for supplying or discharging the additional volume(s).

One further development of the invention comprises an adjustment device for automatic height adjustment of the seat part at the start of a use operation by a user having a predefined weight by means of air being supplied to or discharged from the air spring in such a way that the air spring adjusts to a central position in the third range of the force/travel air spring characteristic. The adjustment device comprises a regulator switch which is arranged in the region of the armrest of the vehicle seat.

The third range, that is to say the comfort range, can be displaced within the force/travel air spring characteristic by means of an operating device by the user and by means of the control device in such a way that the seat part is adjusted to the desired height with sufficiently vibration-damping first and second ranges.

In addition, a recognition device may be provided for recognizing a user using the vehicle seat, in particular by means of his weight.

BRIEF DESCRIPTION OF THE DRAWINGS

Further advantageous embodiments emerge from the dependent claims. Advantages and expedient features can be found in the following description in conjunction with the drawing, in which:

FIG. 1-2 shows a block diagram of the vehicle seat shown in FIG. 1-1;

FIG. 2 shows a schematic diagram of a force/travel air spring characteristic of a suspension device in the "road" mode according to one embodiment of the invention;

DETAILED DESCRIPTION OF THE PREFERRED EMBODIMENT

Figure 1:
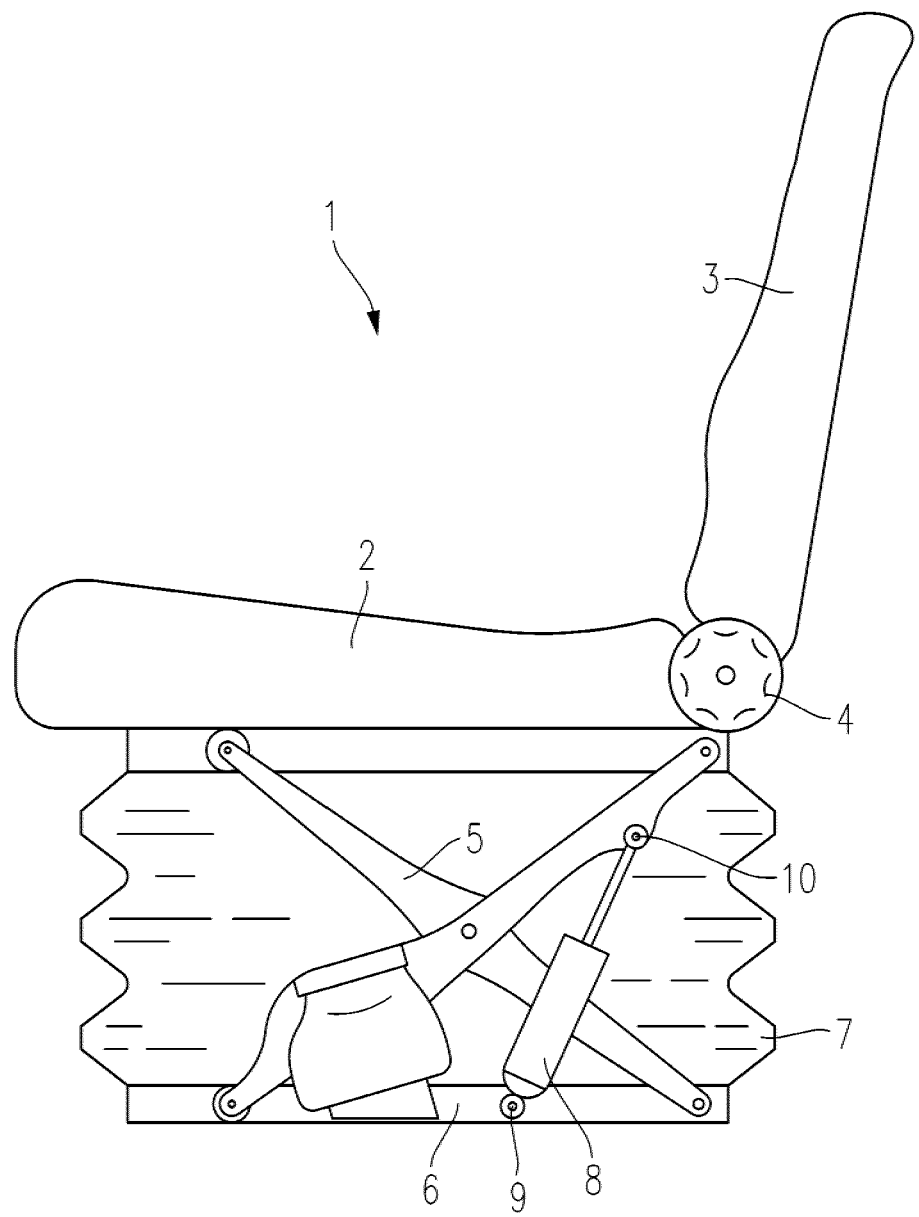
FIG. 1-1 shows a schematic side view of a vehicle seat comprising an air spring.

FIG. 1-1 shows a schematic side view of a vehicle seat. The vehicle seat 1 consists of the seat part 2 and the backrest 3, which are connected to one another by means of a pivot bearing 4. An x-shaped height-adjustable connecting frame 5 is arranged on a lower part 6 within a bellows like covering part 7, said lower part being connected to the vehicle for example by means of guide rails.

An air spring 8 is arranged between an upper part of the frame and the lower part 6. The air spring 8 is connected by its lower end 9 to the lower part 6 and by its upper end 10 to the upper part of the frame. The air spring can be subjected to pressure and tensile stress.

Both the x-shaped frame and the air spring are height-adjustable in such a way that they move downwards when subjected to pressure by a driver using the vehicle seat or when travelling over a pothole and move upwards and/or vibrate for example after travelling over a pothole.

Figures 1, 2:
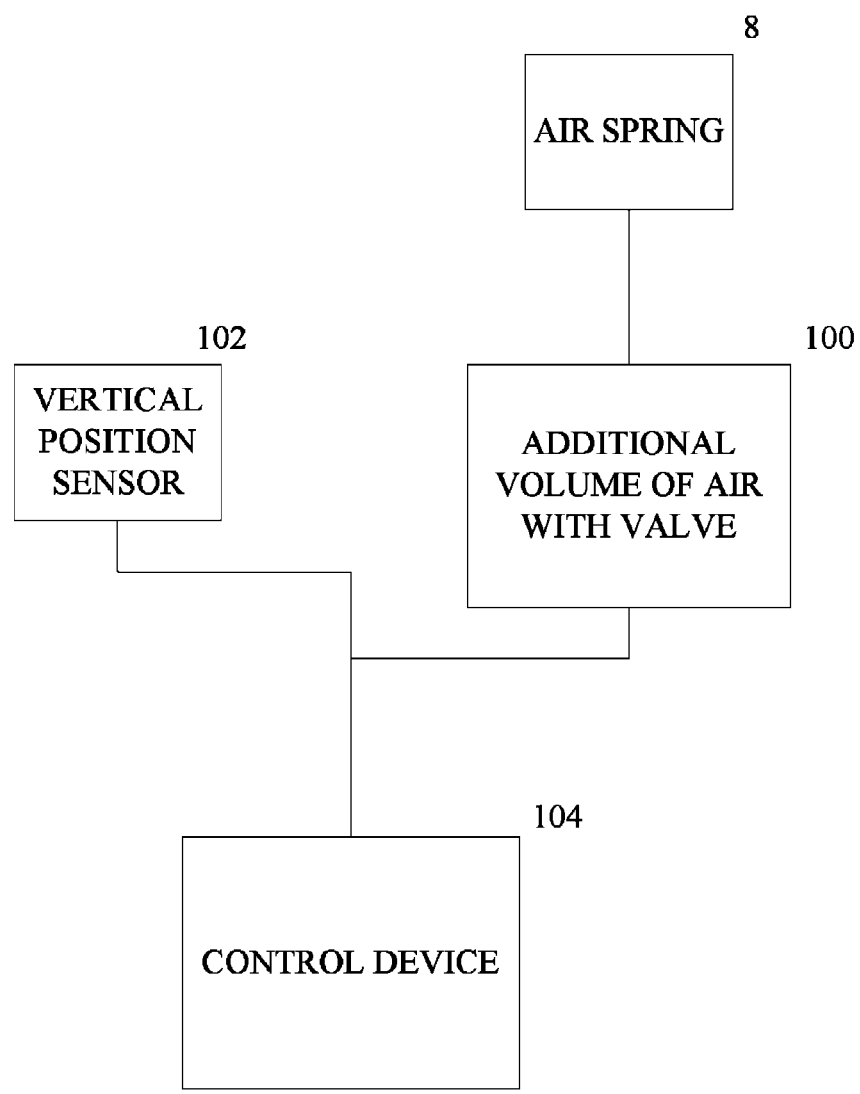
Figure 2:
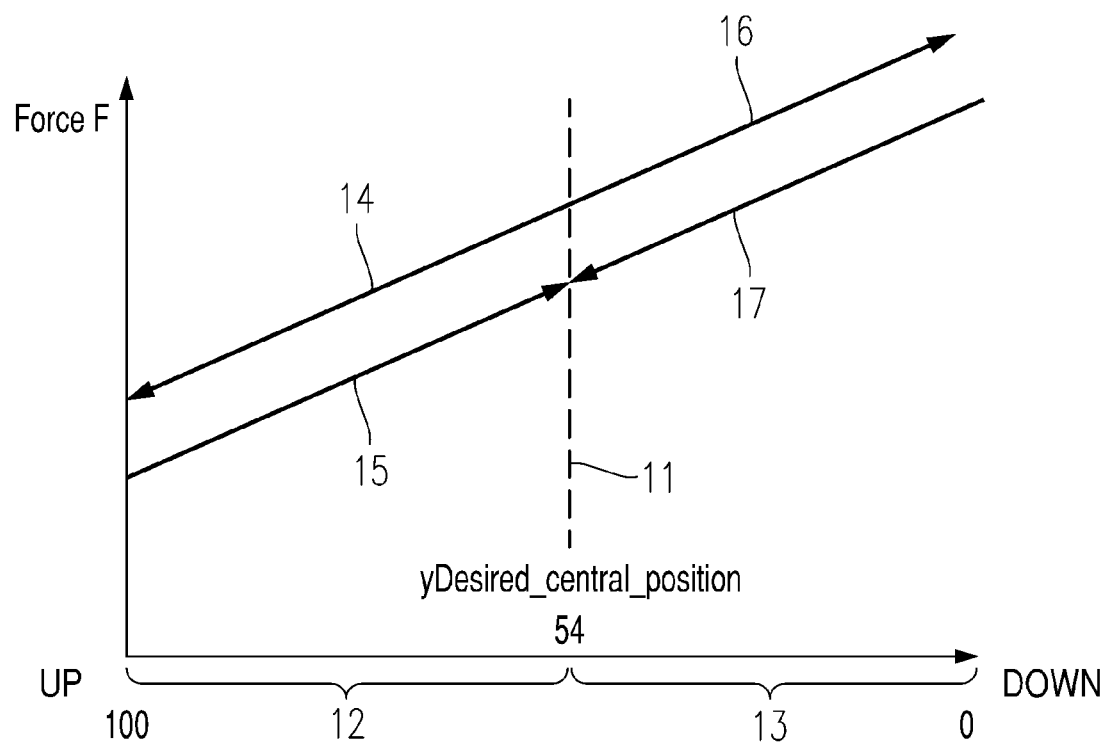

FIG. 1-2 is a block diagram of operable components of the vehicle seat 1 of FIG. 1-1. The air spring 8 is pneumatically coupled to an air source 100 having a valve. A vertical position sensor 102 generates a signal that indicates the vertical position of the vehicle seat 1. In one embodiment, the vertical position sensor 102 is an off-the-shelf sensor. A control device 104 is in signal communication with the vertical position sensor 102 and the valve of the air source 100. The control device 104 closes or opens the valve based the position sensed by the sensor 102 and corresponding velocity and acceleration values and according to a predefined algorithm (see below).

FIG. 2 shows a diagram of the force/travel air spring characteristic of the suspension device according to the invention in the "road" mode. The abscissa shows a height adjustment travel over 100 mm. The desired central position 11 of the vehicle seat in respect of its height is shown in the centre of the measurement range of 100 mm.

The upward movement of the air spring and thus of the seat part 2 is shown in a first range 12 of the air spring characteristic, and the downward movement of the air spring and thus of the seat part 2 is shown in a second region 13. The lighter arrows represent an extension spring movement and the darker arrows represent a return spring movement.

At a measured spring excursion speed value of less than 0.114 m/s, the control device automatically switches into the "road" mode, in which an air spring characteristic with the usual incline and without a comfort range is achieved both during the extension spring movement and during the return spring movement. A comfort range is not required here due to the stable central position of the seat, which is possible on account of the low level of unevenness of a tarred road.

When the seat part and thus the air spring move upwards, a force reduction is obtained, as shown by the arrow 14, During the return movement, the force increases so as to allow a return to the central position, as shown by the arrow 15.

When the seat part and the air spring move downwards, there is an increase in force as shown by the arrow 16, which disappears again due to a reduction in force during the return spring movement as shown by the arrow 17.

Figure 3:
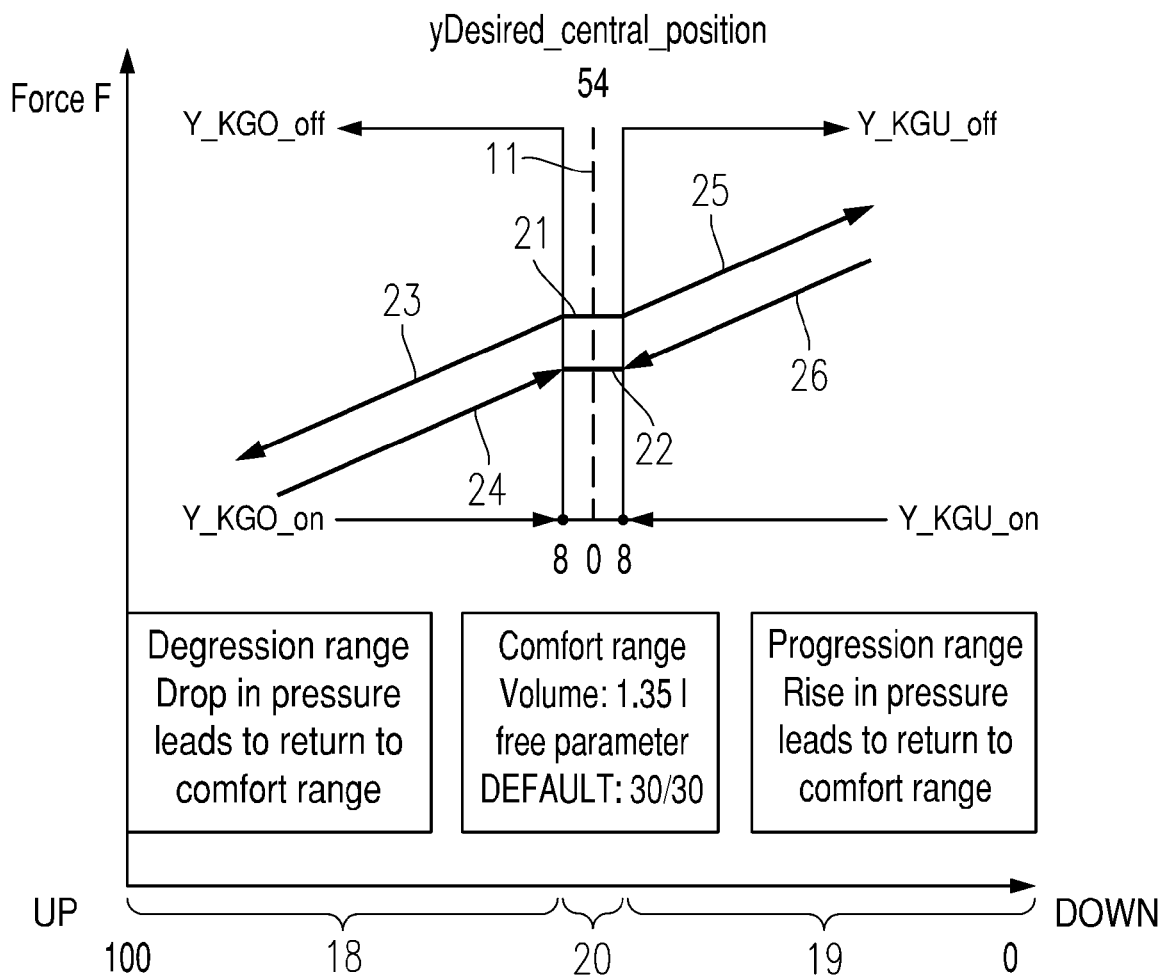
FIG. 3 shows a schematic diagram of the force/travel air spring characteristic of the suspension device in the "road transition" mode.

FIG. 3 shows a diagram of the force/travel air spring characteristic of the suspension device for the "road transition" mode. In this case, there is a transition of the utility vehicle from the tarred road to an uneven road, such as a dirt track, or vice versa.

In a first range 18 and a second range 19, the air spring movements and the return thereof are shown by means of the arrows 23, 24 and 25, 26. In addition, a third range 20 comprising the characteristic sections 21, 22 is arranged as a narrow comfort range in the region of the central position 11, which is obtained by supplying an additional volume of for example 1.35 l.

In the first range 18, which represents a degression range, there is a drop in pressure during the movement (reference 23), which leads to a return to the comfort range 20. In the second range 19, which represents a progression range, a rise in pressure during the movement 25 leads to a return 26 to the comfort range 20.

Figure 4:
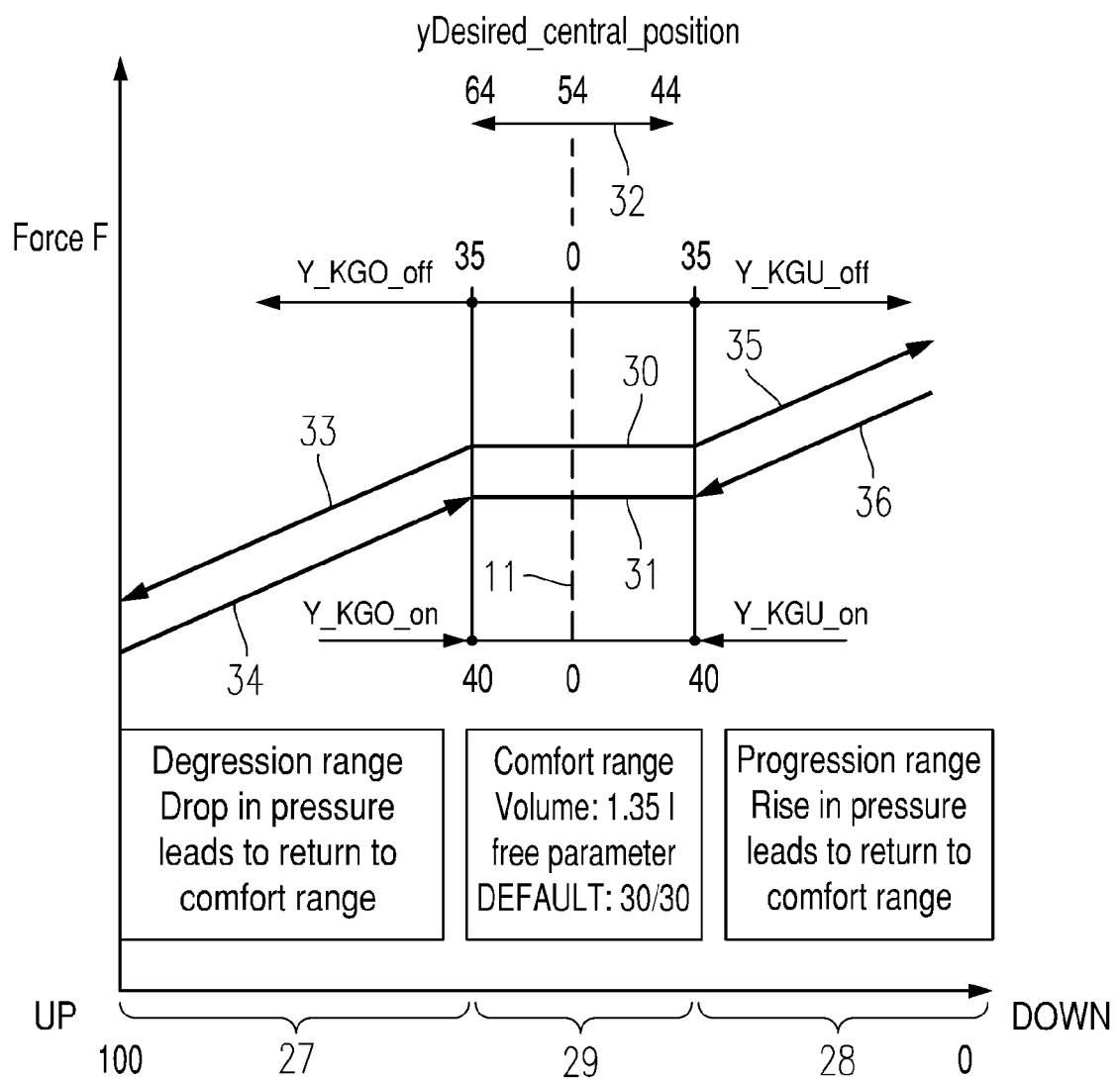
FIG. 4 shows a schematic diagram of the force/travel air spring characteristic of the suspension device in the "difficult ground/field, etc." mode.

FIG. 4 shows a diagram of the force/travel air spring characteristic of a suspension device in the "difficult ground/field, etc." mode. Once again, the excursion and return spring movements 33, 34 and 35, 36 shown in a first and a second range 27, 28 run along the customary incline in the air spring characteristic.

In a third range 29, a wide comfort range comprising the characteristic sections 30, 31 is shown, said comfort range being designed to be relatively wide on account of the uneven ground being traveled over, so as to achieve maximum comfort. This mode is activated at spring excursion speeds of more than 0.114 and less than 0.228 m/s. Reference 32 schematically shows the section of the height adjustment travel in which the vehicle seat can rise and fall with a high level of comfort within the comfort range 29.

In the first range 27, which represents a degression range, a drop in pressure leads to a return to the comfort range, whereas, in the second range 28, which represents a progression range, a rise in pressure leads to a return to the comfort range.

Automatic detection of or distinction between the road conditions according to the modes as illustrated in FIGS. 2 to 4 can be effected as follows: at the start, a weight adjustment takes place when the vehicle seat is newly occupied by a new driver. This takes place automatically, wherein the suspension device is set to an optimized central position level determined beforehand during a previous use of the vehicle. If the vehicle seat is briefly left, for example for a period of less than 8 seconds, no break in occupancy of the seat is detected, no readjustment thus takes place. Longer breaks (as required for example when connecting a trailer, do not lead to readjustment provided that the height of the vehicle driver does not change when the seat is reoccupied.

In addition, initial height adjustment of the vehicle seat is possible when there are no large spring excursion movements.

Once the weight has been set and the height has been adjusted, the suspension device is automatically set to the "road transition" mode at the start of travel.

Depending on the condition of the road and the forces introduced as a result into the suspension device and/or the spring excursions, the "road" or "difficult ground/field, etc." mode is selected by means of the control device following the evaluation of spring excursion speed or acceleration values. If no values relating to the "difficult ground/field, etc." mode exist, the "road" mode is selected by way of priority. This permits level-optimized seating in relation to the optimized operation of brake pedals, clutch pedals, etc.

When changing from the "difficult ground/field, etc." mode to the "road" mode, this takes place via the "road transition" mode within a period of approximately 10 seconds. Upon leaving the tarred road, adjustment parameters of the suspension device are immediately set to the "difficult ground/field, etc." mode on account of the detected values for the spring excursion and the speeds of the spring excursion.

Figure 5:
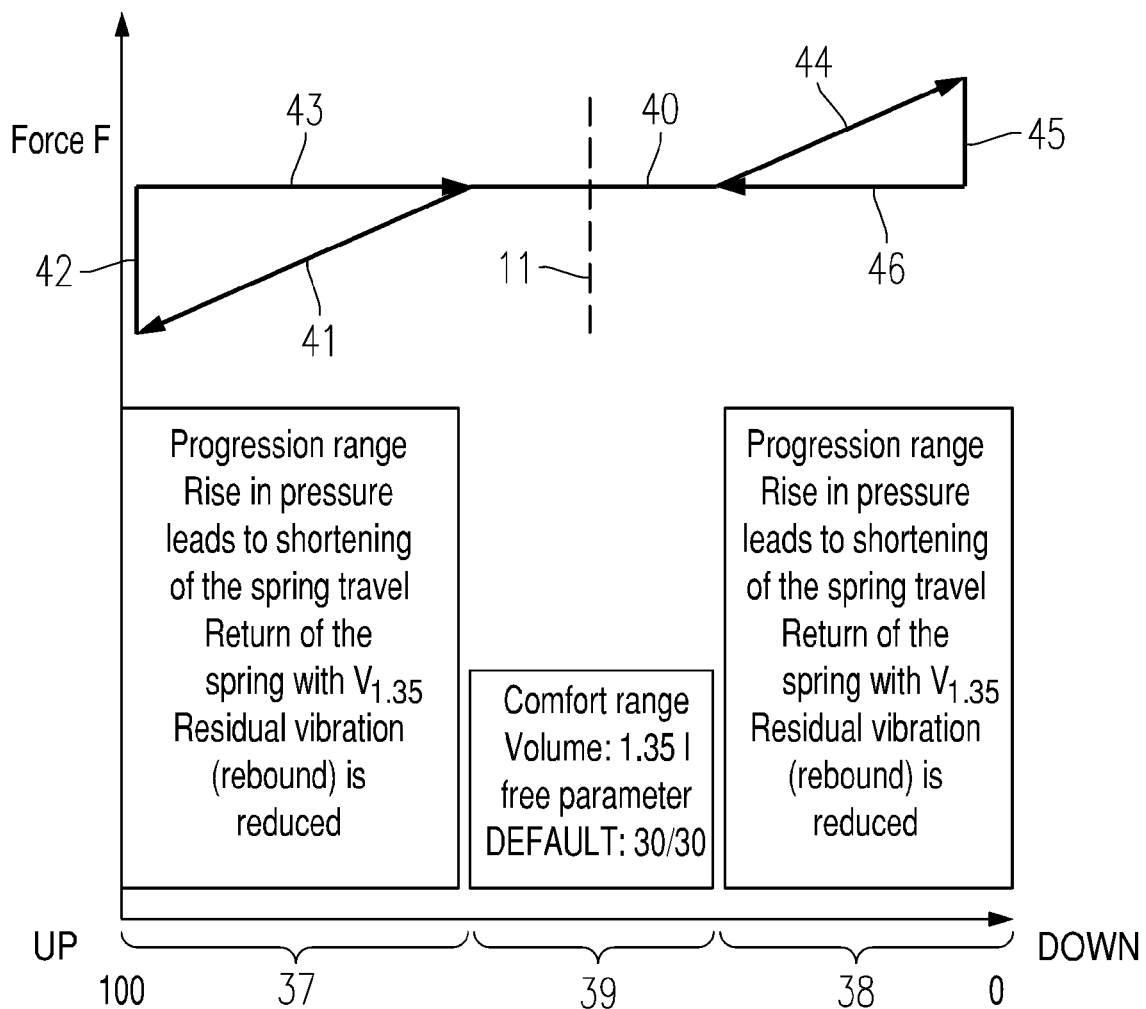
FIG. 5 shows a schematic diagram of the force/travel air spring characteristic of the suspension device at medium spring excursion speeds.

FIG. 5 shows a diagram of the force/travel air spring characteristic of the suspension device at medium spring excursion speeds. The width of a third range 39, which represents the comfort range, corresponds to the width of the comfort range shown in FIG. 4. This can also be seen on the basis of a characteristic section 40.

In a first range 37, in the event of an upward spring movement as shown by reference 41, the additional volume is firstly switched off, as a result of which a rise in pressure is obtained in the progression range shown here, which leads to a shortening of the spring travel. During a return spring movement during the transition from the arrow 41 to an arrow 42, 43, the additional volume is then switched on, which, after the previous braking during the spring excursion movement 41, gives rise to an increase in force as shown by reference 42, up to the level of the horizontally running characteristic section 40. The air spring is then returned to the comfort range by means of the additional volume without any incline in the characteristic (cf. reference 43).

In a second range 38, during a downward spring movement, braking is effected by initially switching off the additional volume (reference 44). The additional volume is then switched on at the transition to the return spring movement 45, 46, wherein an initial reduction in force is achieved down to the level of the horizontally running characteristic section 40 and then the return characteristic continues without any incline, as shown by reference 46. Vibration is reduced in both cases.

Figure 6:
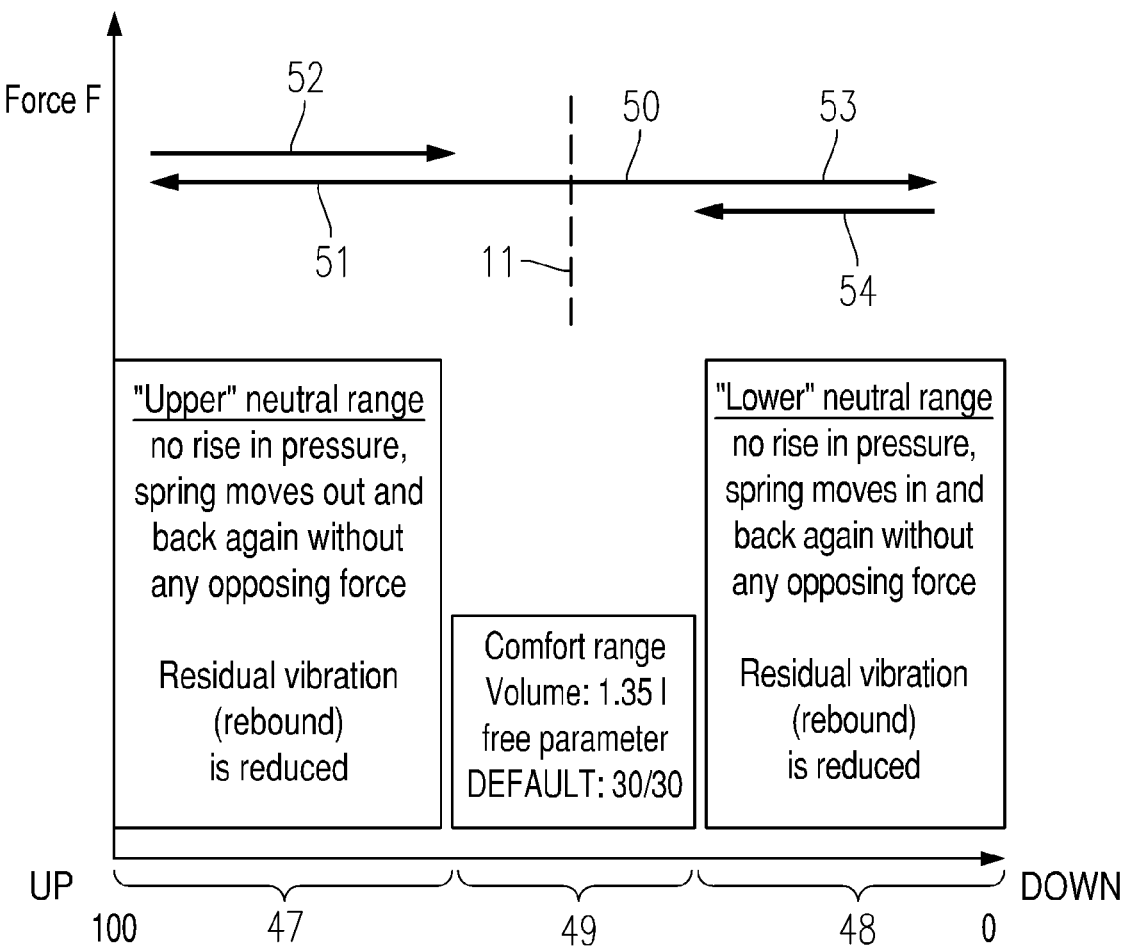
FIG. 6 shows a schematic diagram of the force/travel air spring characteristic of the suspension device at high spring excursion speeds.

FIG. 6 shows a diagram of the force/travel air spring characteristic of the suspension device at a high spring excursion speed of for example more than 0.3185 m/s and less than 0.353 m/s. In the event of an upward or downward spring movement in this speed range, in a first and second range 47, 48 of the air spring characteristic the additional volume is already switched on at the start of the spring movement, that is to say when passing beyond the boundaries of a comfort range 49. As a result, a characteristic 51, 52, 53, and 54 which runs horizontally and without any incline in continuation of a characteristic section 50 is obtained during the extension and return spring movement.

In such a first and second range which is neutral with respect to the characteristic profile, no rise in pressure takes place during the spring movement and the suspension moves out or in and back again without any opposing force. Vibration is further reduced.

Figure 7:
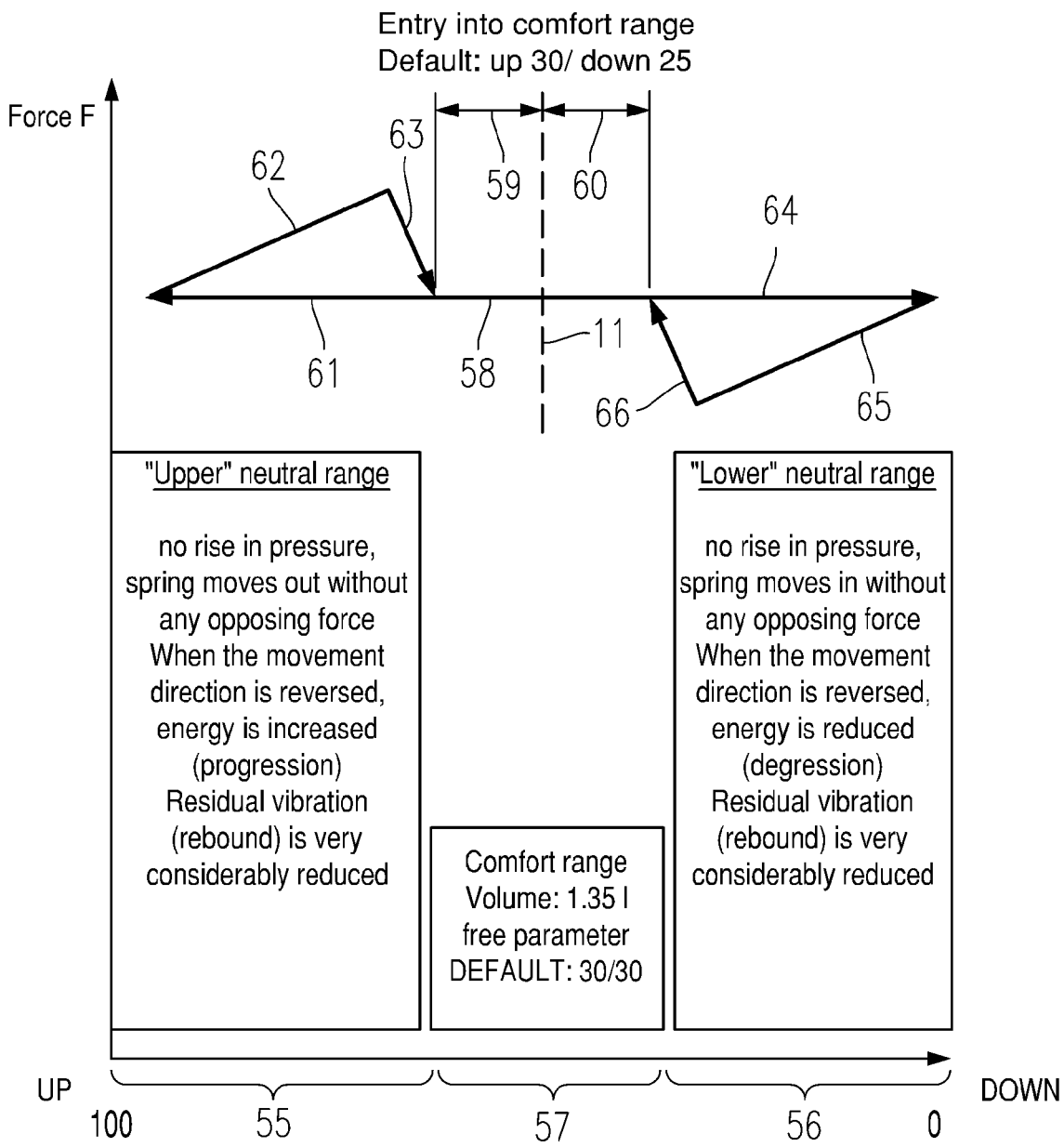
FIG. 7 shows a schematic diagram of the force/travel air spring characteristic of the suspension device at very high spring excursion speeds.

FIG. 7 shows a diagram of the force/travel air spring characteristic of the suspension device at a spring excursion speed of more than 0.353 m/s. As in the diagram shown in FIG. 6, in a first range 55 and in a second range 56 the additional volume is once again already switched on at a transition out of the third range or the comfort range 57. As a result, a continuation of the characteristic 58, which already runs horizontally in the comfort range, is once again obtained, as shown by characteristic sections 61, 64.

At the point of reversal from the extension spring movement to the return spring movement, that is to say in the region of the tips of the two arrows 61, 64, the additional volume is switched off, resulting in an increase in force or a reduction in force while at the same time covering a section as shown by references 62, 65. A considerable reduction in force or a considerable increase in force then takes place as shown by references 63, 66. Accordingly, no rise in pressure takes place during the spring movement, as a result of which the air spring moves out in the first range 55 and moves in the second range without any opposing force. From the point of reversal of the movement direction of the air spring, an increase in energy (progression) takes place in the first range and a reduction in energy (degression) takes place in the second range. Vibration is very considerably reduced in both cases, resulting in a high level of damping.

Figure 8:
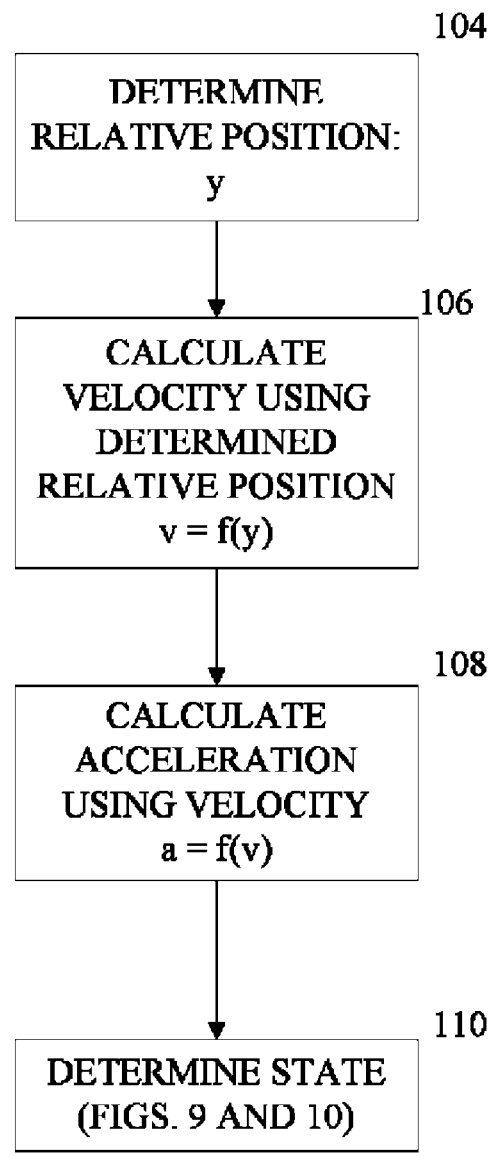
FIGS. 8-10 are flow diagrams of an example process performed by the systems shown in FIGS. 1-1 and 1-2.

FIG. 8 shows a flowchart of exemplary process 100 for controlling seat position. First, at a block 104 relative position of the seat (FIG. 1) in Y-direction (vertical motion of seat) is measured. The mathematical differentiation of the measured distance y results in the velocity v=f(y), see block 106. Further differentiation results in the acceleration value a=f(v), see block 108. The resulting acceleration value a and a maximum velocity value v are sent to a spring state machine determination process, see block 110, as shown in FIGS. 9 and 10.

The spring state machine (process 140) starts in the comfort region (29, 39, 49, 57 according to the horizontal force lines 30, 40, 50 and 58 in FIGS. 4-7) with a soft springrate=N, see block 150.

Figure 9:
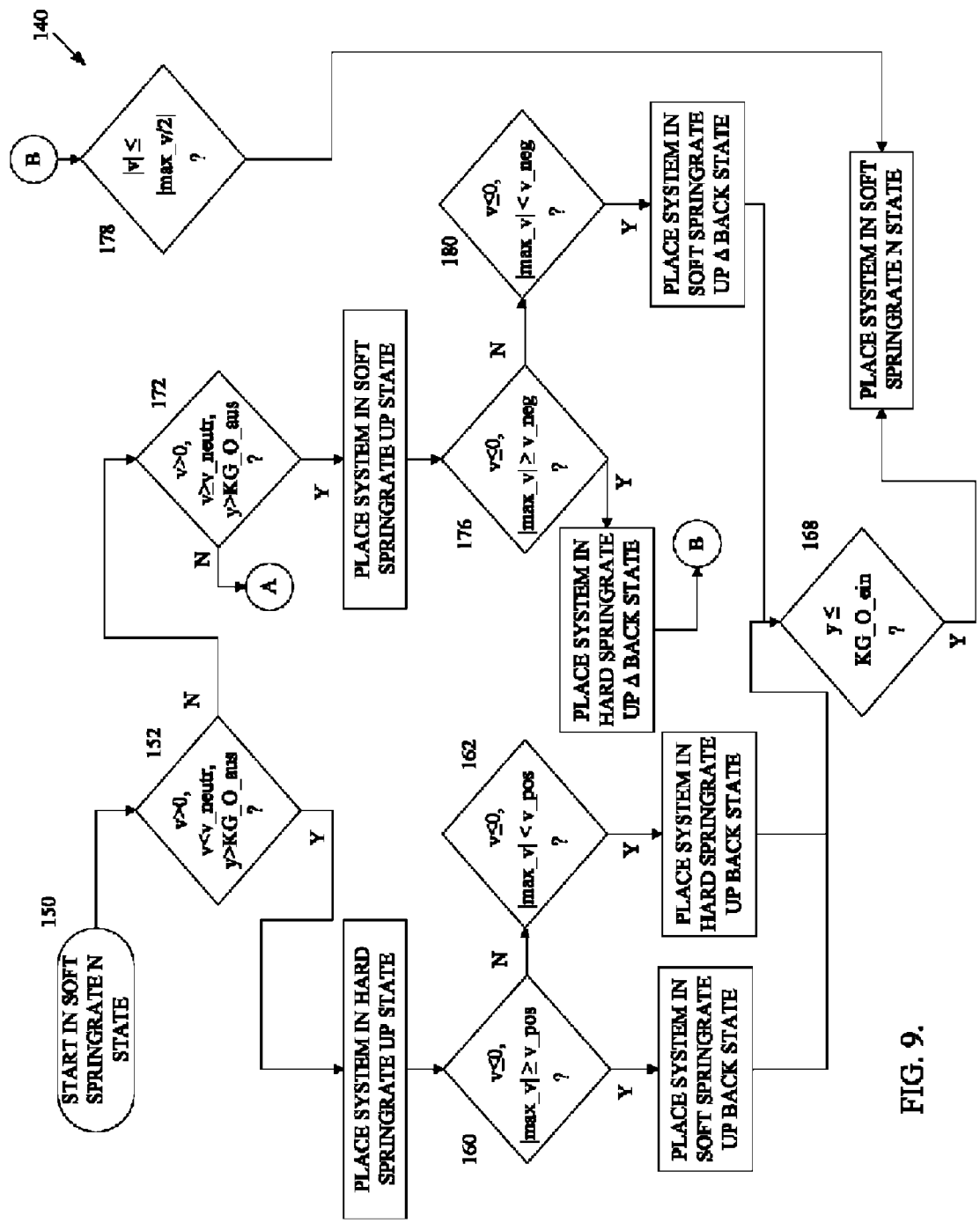
Figure 10:
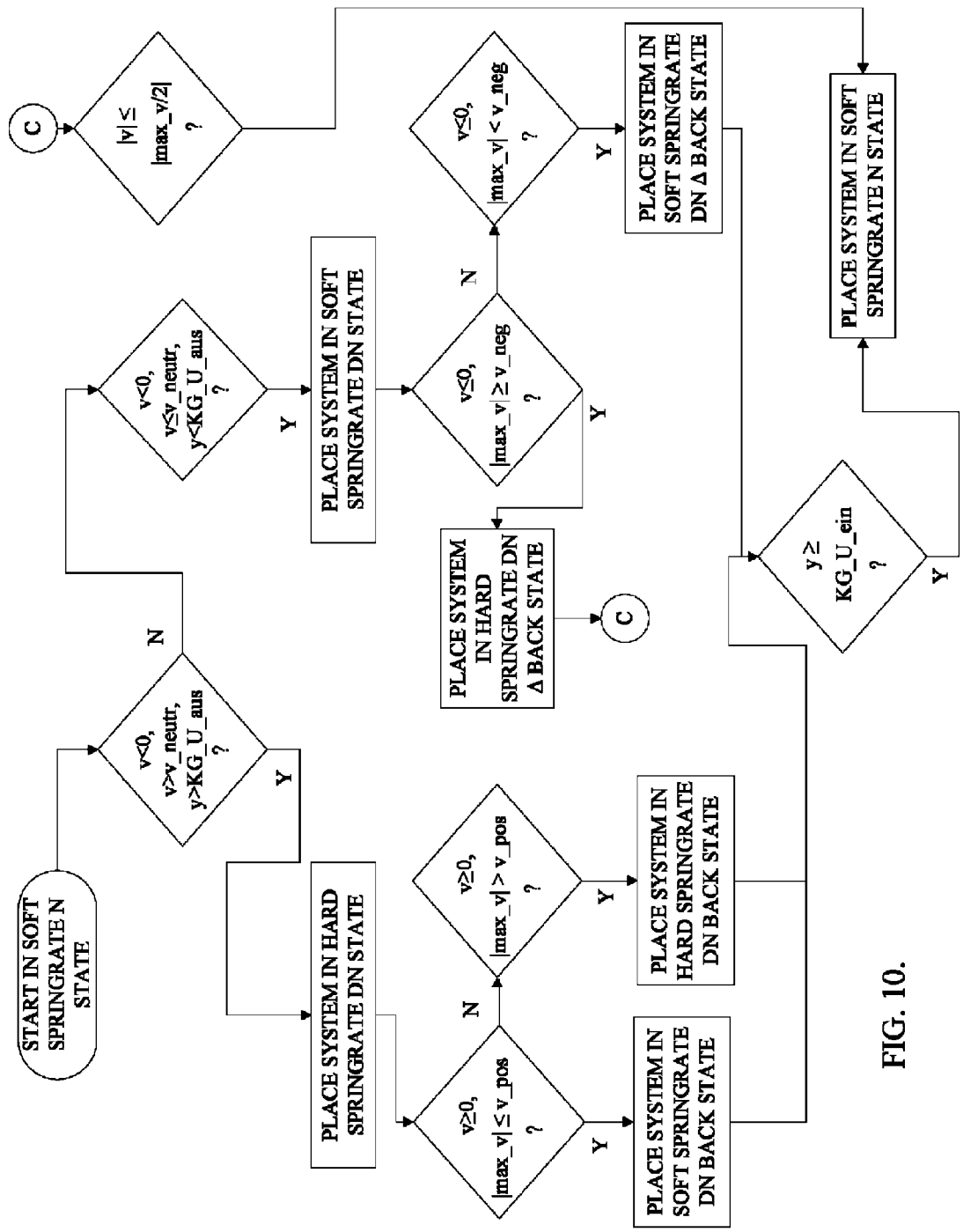

The following terms are used in the process shown in FIGS. 9 and 10:

v_neutr—parameter for velocity with soft springrate towards end of suspension stroke;

v_pos—parameter for velocity with hard springrate towards end of suspension stroke and soft springrate back in the opposite direction;

v_neg—parameter for velocity with soft springrate towards end of suspension stroke and hard springrate back in the opposite direction;

KG_O_aus—threshold between soft to hard springrate towards upper end of suspension stroke;

KG_O_ein—threshold between hard to soft springrate back to middle of suspension stroke;

KG_U_aus—threshold between soft to hard springrate towards lower end of suspension stroke;

KG_U_ein—threshold between hard to soft springrate back to middle of suspension stroke; and SuspMid—middle of suspension stroke.

The expression "springrate" is equivalent to "springconstant". The present invention changes the springconstant of the spring from a hard to a soft condition. Springconstant is defined as $$\frac{\text{Force } F}{\text{Distance } s} = D(springconstance \text{ or } springrate).$$

A hard springrate and soft springrate conditions occur when the seat goes up (UP) and back (UP back). Also a special hard springrate and soft springrate conditions occurs when the seat goes down (DN) and back (DN back).

The springconstant of a normal spring is constant. However, if the spring is connected with an additional air volume, then the result is a softer springrate. If additional air volume is not used, then the result is a harder springrate.

At a decision block 152, when:

$v>0$, $v<v\_neutr$, and $y>KG\_O\_aus$,

The elongation of the seat reaches the border from the soft to hard springrate towards the upper end of the suspension stroke. v_neutr is an optimized velocity parameter for swinging the system in an optimized manner, e.g. 60-70 m/s. Optimized means that at a special velocity v_neutr, namely at 60-70 m/s, there is no need to a change the springrate from hard to soft or from soft to hard. Rather, the spring does not reach the end of the springdistance. For example in FIG. 5, when the condition in the decision block 152 is true, the seat has reached the border from the region 39 to the region 37. As such, the spring state machine changes to a hard springrate UP state see line 41.

In the hard springrate UP state, at a decision block 160, if $v<=0$ and $|max\_v| \geq v\_pos$, a soft springrate UP state exists. In the soft springrate UP state, the valve is switched on and the change from the lines 41 to 42 then 43 happens.

If instead the condition $$|\max\_v| < v\_pos$$

is true (see decision block 162, the change shown between lines 33 and 34 (FIG. 4) occurs thus putting the system in a hard springrate UP back state.

After the decision blocks 160, 162, the process 140 determines at a decision block 168, if $$y <= KG\_O\_ein.$$

If the condition in decision block 168 is true, the transfer between conditions 34 to 31 or 43 to 40 occurs (FIGS. 4 and 5), thus returning to the soft springrate N state.

If the condition at decision block 152 is false (no), then the process 140 determines, a decision block 172, that the system is in a soft springrate UP state if $$v > 0,$$

$$v >= v\_neutr, \text{ and}$$

$$y > KG\_O\_aus.$$

Refer to lines 51, 61 in FIGS. 6 and 7.

Then if at decision block 176

$$v <= 0 \text{ and}$$

$$|\max\_v| \geq v\_neg,$$

the valve is switched off, thus putting the system in a hard springrate UP Δ back state (see line 62). Then at decision block 178 if $$|v| \leq \left|\max\_\frac{v}{2}\right|$$

is true (yes), (transfer from 62 to 63), the valve is switched on and the system transitions to the soft springrate N state (line 58).

$$\left|\max\_\frac{v}{2}\right|$$

is found empirically.

If at decision block 176 the conditions $$v <= 0 \text{ and}$$

$$|\max\_v| \geq v\_neg$$

are not true, then at decision block 180 if $$v <= 0 \text{ and}$$

$$|\max\_v| < v\_neg$$

are true, transfer of the lines 51 to 52 as shown in FIG. 6 occurs and the system is now in a soft springrate UP Δ back state Then as soon as y<=KG_O_ein (see decision block 184), a transfer occurs from lines 52 to 50 and the state returns to the soft springrate N state.

FIG. 10 is similar to FIG. 9 except for downward movement—namely the regions 28, 38, 48 and 56.

All of the features disclosed in the application documents are claimed as essential to the invention in so far as they are novel individually or in combination with respect to the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle seat comprising:
    a seat part;
    a base section;
    at least one air spring arranged between the seat part and the base section;
    a position sensor configured to sense position of the seat part relative to the base section;
    an air source with valve, the air source being coupled to the at least one air spring via the valve; and
    a control device configured to
        determine velocity of the seat part based on seat part position information received from the position sensor;
        determine state of the seat part based on seat part position and velocity; and
        control the valve based on the determined state, wherein the determined state is one of a plurality of states each having a different at least one of a velocity and acceleration range associated therewith;
    wherein the control device is further configured to couple the air spring to the air source according to displacement according to a profile of a plurality of profiles corresponding to the determined state; and
    wherein each profile of the plurality of profiles having a higher at least one of velocity and acceleration range associated therewith than another profile of the plurality of profiles has a larger comfort region including a neutral position of the air spring in which the air source is connected to the air spring than the other profile;
    wherein the control device is configured to determine that the at least one of velocity and acceleration of the seat lie within a first range;
    wherein the control device is configured to, in response to determining that the at least one of velocity and acceleration of the seat lie within the first range, disconnect the air source from the air spring regardless of compression and extension of the air spring;
    wherein the control device is configured to determine that the at least one of velocity and acceleration of the seat lie within a second range, the second range being larger than the first range;
    wherein the control device is configured to, in response to determining that the at least one of velocity and acceleration of the seat lie within the second range, connect the air source to the air spring through movement of the seat through a first comfort range including the neutral position of the air spring and disconnect the air source from the air spring through movement of the seat outside of the first comfort range;
    wherein the control device is configured to determine that the at least one of velocity and acceleration of the seat lie within a third range, the third range being larger than the second range;

wherein the control device is configured to, in response to determining that the at least one of velocity and acceleration of the seat lie within the third range, connect the air source to the air spring through movement of the seat through a second comfort range including the neutral position of the air spring and disconnect the air source from the air spring through movement of the seat outside of the second comfort range, the second comfort range being larger than the first comfort range.

2. The vehicle seat of claim 1, wherein positive velocity of the seat part is in a direction away from the base section relative to a neutral position, the following state determinations are made in the direction away from the base section relative to the neutral position, a first state is determined to occur when the position of the seat part is within a first threshold distance range from the base section, after the first state, a second state is determined to occur when the position of the seat part is greater than a first threshold distance from an end of travel position and the velocity is less than a first velocity threshold, after the first state, a third state is determined to occur when the position of the seat part is greater than the first threshold distance from an end of travel position and the velocity is greater than or equal to the first velocity threshold, after the second state, a fourth state is determined to occur when the velocity goes to zero or below and maximum velocity is greater than or equal to a second velocity threshold, after the second state, a fifth state is determined to occur when the velocity goes to zero or below and maximum velocity is less than the second velocity threshold, after the third state, the fifth state is determined to occur when the velocity goes to zero or below and maximum velocity is greater than or equal to a third velocity threshold, after the third state, the fourth state is determined to occur when the velocity goes to zero or below and maximum velocity is less than the third velocity threshold, after the fourth and fifth states, the first state is determined to occur when the position of the seat part is less than or equal to a second threshold distance from the end of travel position.

3. The vehicle seat of claim 2, wherein negative velocity of the seat part is in a direction towards the base section relative to a neutral position, the following state determinations are made in the direction towards the base section relative to the neutral position, a sixth state is determined to occur when the position of the seat part is within a second threshold distance range from the base section, after the sixth state, a seventh state is determined to occur when the position of the seat part is greater than a third threshold distance from an end of travel position and the velocity is less than the first velocity threshold, after the sixth state, an eighth state is determined to occur when the position of the seat part is greater than the third threshold distance from an end of travel position and the velocity is greater than or equal to the first velocity threshold, after the seventh state, a ninth state is determined to occur when the velocity goes to zero or below and maximum velocity is greater than or equal to the second velocity threshold, after the seventh state, a tenth state is determined to occur when the velocity goes to zero or below and maximum velocity is less than the second velocity threshold, after the eighth state, the tenth state is determined to occur when the velocity goes to zero or below and maximum velocity is greater than or equal to the third velocity threshold, after the eighth state, the ninth state is determined to occur when the velocity goes to zero or below and maximum velocity is less than the third velocity threshold, after the ninth and tenth states, the sixth state is determined to occur when the position of the seat part is less than or equal to a fourth threshold distance from the end of travel position.

4. The vehicle seat of claim 3, wherein the control device commands the valve to allow air into the air spring while the second state is occurring, wherein the control device commands the valve to allow air into the air spring while the second state is occurring.

* * * * *